United States Patent
Takatsuka et al.

(10) Patent No.: US 10,093,385 B2
(45) Date of Patent: Oct. 9, 2018

(54) STRADDLE-TYPE VEHICLE

(71) Applicant: HONDA MOTOR CO., LTD., Tokyo (JP)

(72) Inventors: Kazuhiro Takatsuka, Wako (JP); Yoshihiro Hashimoto, Wako (JP); Kosuke Inase, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 118 days.

(21) Appl. No.: 15/219,283

(22) Filed: Jul. 26, 2016

(65) Prior Publication Data

US 2017/0029063 A1 Feb. 2, 2017

(30) Foreign Application Priority Data

Jul. 29, 2015 (JP) .................. 2015-149800

(51) Int. Cl.
| | | |
|---|---|---|
| *B62L 1/00* | (2006.01) | |
| *B60T 8/36* | (2006.01) | |
| *B62K 19/32* | (2006.01) | |
| *B62K 21/02* | (2006.01) | |
| *B62L 3/02* | (2006.01) | |

(52) U.S. Cl.
CPC ............ *B62L 1/005* (2013.01); *B60T 8/3685* (2013.01); *B62K 19/32* (2013.01); *B62K 21/02* (2013.01); *B62L 3/02* (2013.01)

(58) Field of Classification Search
CPC ........... B62L 1/005; B62L 3/02; B62K 19/32; B62K 21/02
USPC ....................................................... 180/219
See application file for complete search history.

(56) References Cited

U.S. PATENT DOCUMENTS 8,887,859 B2 * 11/2014 Matsushima ........... B62L 3/023
   180/219
2005/0134114 A1    6/2005 Asahi

FOREIGN PATENT DOCUMENTS

| JP | 2005-178632 | 7/2005 |
|---|---|---|
| JP | 2010-052526 | 3/2010 |
| JP | 2010-058699 | 3/2010 |

(Continued)

OTHER PUBLICATIONS

Extended European Search Report for corresponding EP Application No. 16181534.5-1756, dated Dec. 13, 2016.

(Continued)

*Primary Examiner* — Joseph M Rocca
*Assistant Examiner* — Felicia L. Brittman
(74) *Attorney, Agent, or Firm* — Mori & Ward, LLP

(57) ABSTRACT

A straddle-type vehicle includes a steering stem, a top bridge, a first front fork, a second front fork, a front wheel braking unit, an ABS modulator, a supporter, and a brake pipe. The front wheel braking unit is provided at the first front fork. The ABS modulator is disposed rearward with respect to the top bridge. The supporter is provided at the second front fork forward with respect to the top bridge. The brake pipe extends from the ABS modulator to the front wheel braking unit through the supporter. The brake pipe between the ABS modulator and the supporter passes through a space between the head pipe and the second front fork below the top bridge. The brake pipe between the supporter and the front wheel braking unit passes through a position higher than the top bridge to be connected to the front wheel braking unit.

18 Claims, 15 Drawing Sheets

(56) References Cited

FOREIGN PATENT DOCUMENTS

JP        2012-210891      11/2012
JP        2014034339 A  *  2/2014

OTHER PUBLICATIONS

Japanese Office Action for corresponding JP Application No. 2015-149800, dated Mar. 6, 2017 (w/ English machine translation).

* cited by examiner

STRADDLE-TYPE VEHICLE

CROSS-REFERENCE TO RELATED APPLICATIONS

The present application claims priority under 35 U. S. C. § 119 to Japanese Patent Application No. 2015-149800, filed Jul. 29, 2015. The contents of this application are incorporated herein by reference in their entirety.

BACKGROUND OF THE INVENTION

Field of the Invention

The present invention relates to a straddle-type vehicle.

Discussion of the Background

Straddle-type vehicles employing ABS as their braking devices have been proposed (Japanese Patent Application Publication No. 2010-58699 and Japanese Patent Application Publication No. 2012-210891, for example). To employ ABS, it is necessary to place brake pipes for connecting a brake master cylinder and an ABS modulator to each other and brake pipes for connecting the ABS modulator and brake systems of wheels.

Meanwhile, in straddle-type vehicles represented by off-road vehicles, since the amount of stroke of a pair of front forks is set relatively long, the brake pipe connected to the brake system of the front wheel needs to be placed so that it can follow the expansion of the pair of front forks. Japanese Patent Application Publication No. 2012-210891 discloses a structure in which an ABS modulator (ABS module) is disposed on a handlebar and a brake pipe extending from the ABS modulator to a brake system of a front wheel is curved above a top bridge. This curve of the brake pipe above the top bridge allows the brake pipe to ensure play long enough to follow the expansion of a pair of front forks.

SUMMARY OF THE INVENTION

According to one aspect of the present invention a straddle-type vehicle includes a steering stem, a top bridge, a pair of front forks, a front wheel braking unit, an ABS modulator, and a brake pipe. The steering stem is turnably supported on a head pipe provided in a front part of the vehicle. The top bridge is provided on an upper end part of the steering stem. The pair of front forks are respectively supported by left and right fork insertion holes of the top bridge. The front wheel braking unit is placed on a side close to a first front fork of the pair of front forks and configured to apply braking force to a front wheel. The ABS modulator is disposed behind the top bridge and configured to control the braking force of the front wheel braking unit. The brake pipe connects the ABS modulator and the front wheel braking unit to each other. The straddle-type vehicle includes a supporter which is placed on a side close to a second front fork of the pair of front forks at a position ahead of the top bridge with respect to the vehicle and configured to support the brake pipe. The brake pipe extends from a part of the vehicle behind the top bridge and passes through a space between the head pipe and the second front fork below the top bridge to be supported by the supporter. The brake pipe extends upward through the supporter and curves toward the first front fork while passing through a higher position than the top bridge. The brake pipe extends along the first front fork to be connected to the front wheel braking unit.

According to another aspect of the present invention, a straddle-type vehicle includes a steering stem, a top bridge, a first front fork, a second front fork, a front wheel braking unit, an ABS modulator, a supporter, and a brake pipe. The steering stem is turnably supported by a head pipe which is provided in a front part in a front-rear direction of the vehicle. The top bridge is provided on an upper end part of the steering stem. The top bridge has a first fork insertion hole and a second fork insertion hole. The first front fork is supported by the first front insertion hole. The second front fork is supported by the second front insertion hole. A front wheel is provided between the first front fork and the second front fork. The front wheel braking unit is provided at the first front fork to apply braking force to the front wheel. The ABS modulator is disposed rearward with respect to the top bridge in the front-rear direction. The ABS modulator is configured to control the braking force applied by the front wheel braking unit. The supporter is provided at the second front fork forward with respect to the top bridge in the front-rear direction. The brake pipe is supported by the supporter. The brake pipe extends from the ABS modulator to the front wheel braking unit through the supporter. The brake pipe between the ABS modulator and the supporter passes through a space between the head pipe and the second front fork below the top bridge. The brake pipe between the supporter and the front wheel braking unit passes through a position higher than the top bridge to be connected to the front wheel braking unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
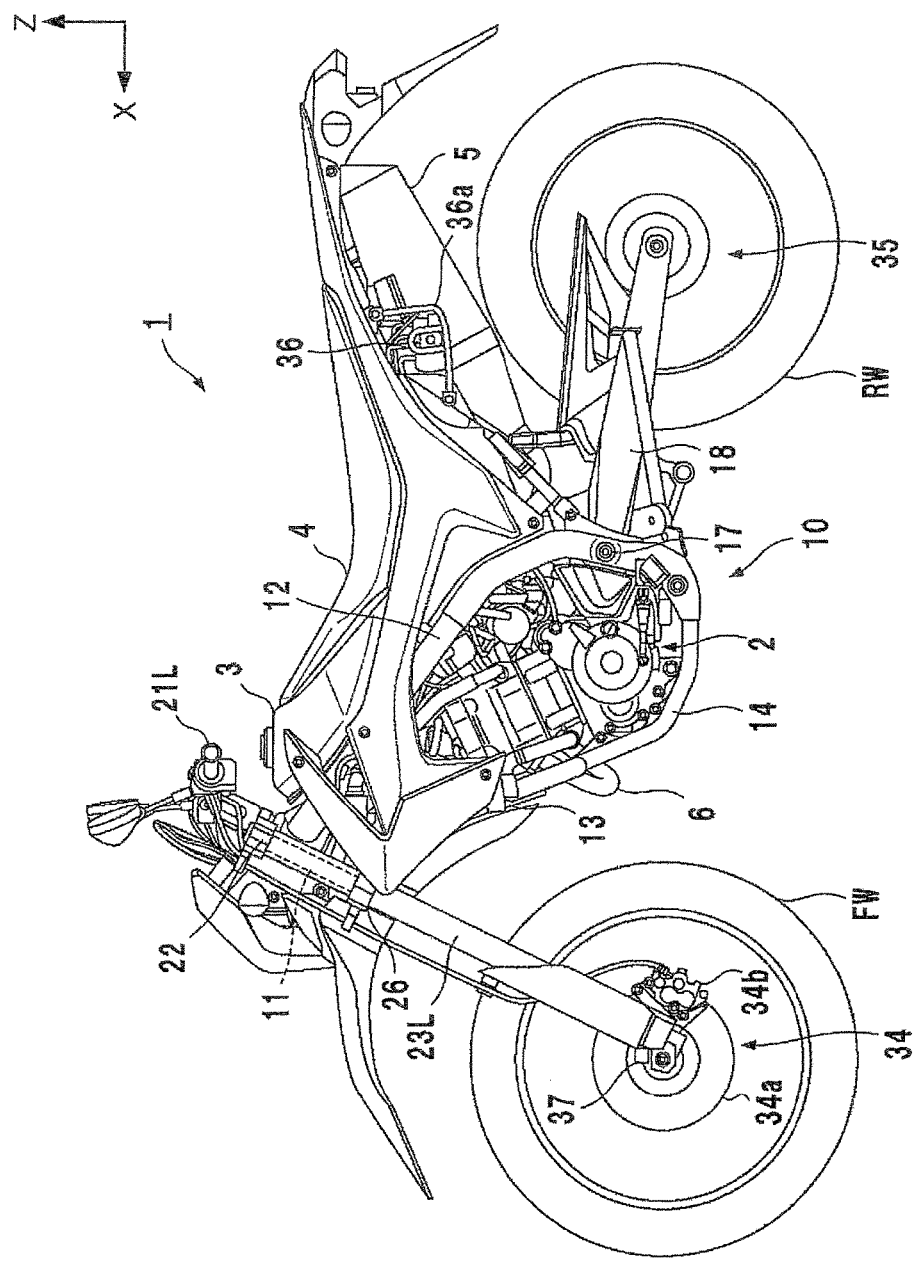
FIG. 1 is a left side view of a straddle-type vehicle according to an embodiment of the present invention.

The embodiments will now be described with reference to the accompanying drawings, wherein like reference numerals designate corresponding or identical elements throughout the various drawings.

A straddle-type vehicle according to an embodiment of the present invention is described with reference to the drawings. Throughout the drawings, arrows X, Y, and Z indicate directions orthogonal to one another, in which the X direction indicates the longitudinal direction of the straddle-type vehicle, the Y direction indicates the vehicle widthwise direction (lateral direction) of the straddle-type vehicle, and the Z direction indicates the vertical direction thereof.

<General Outline of Straddle-Type Vehicle>

Figure 2:
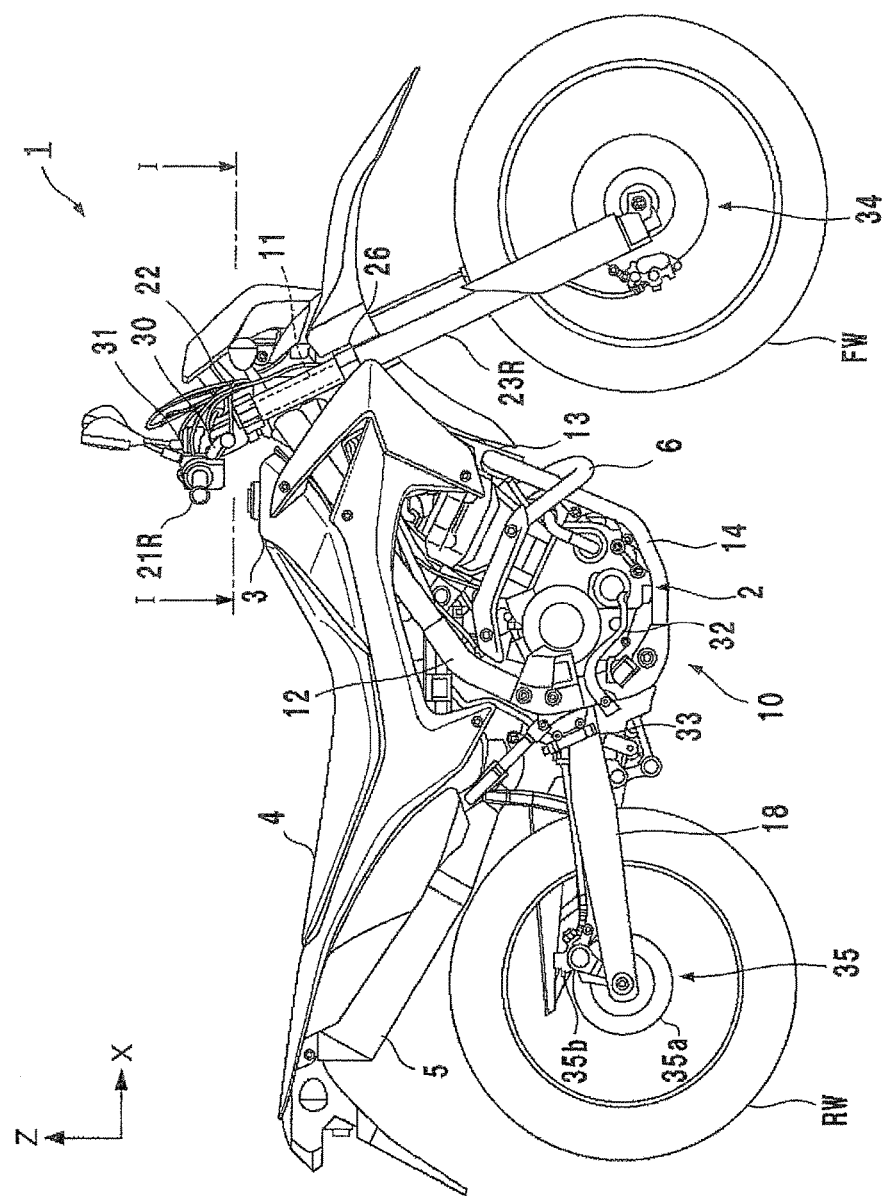
FIG. 2 is a right side view of the straddle-type vehicle of FIG. 1.
Figure 3:
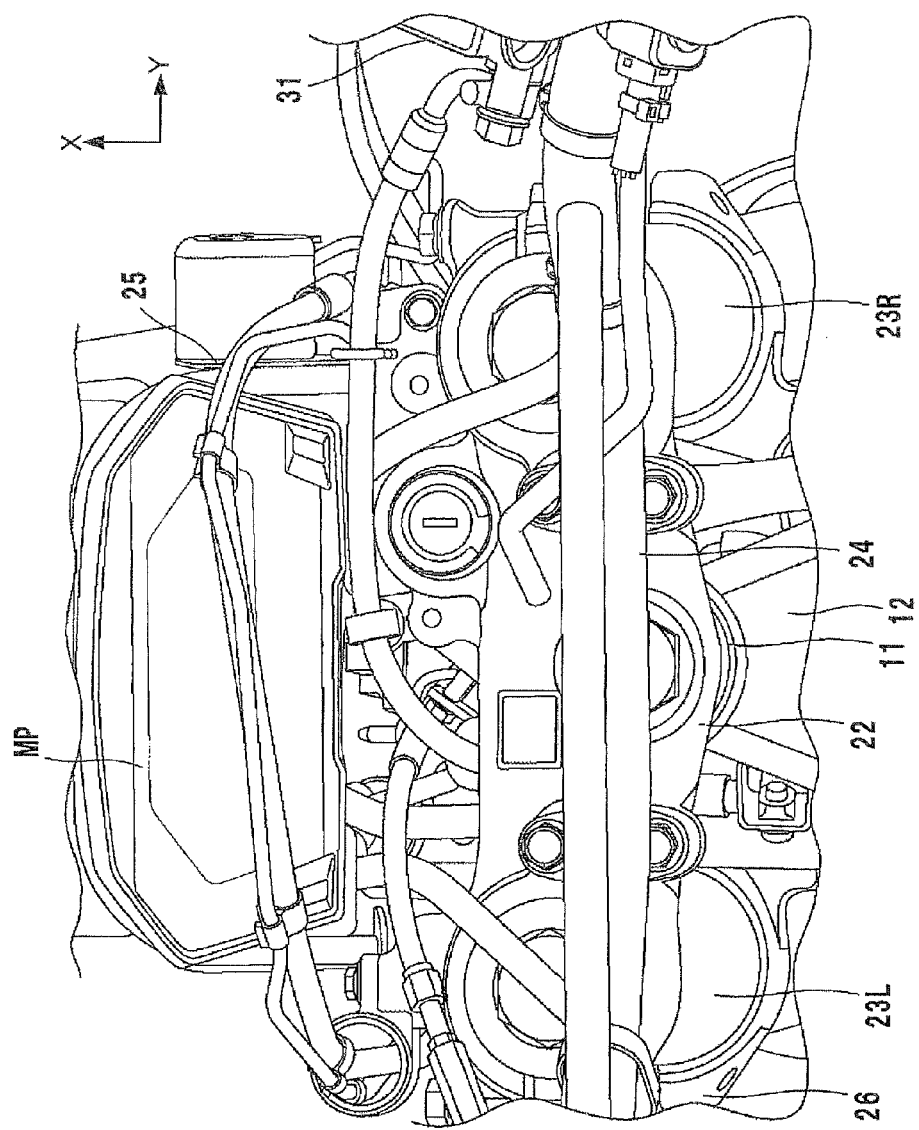
FIG. 3 is a plan view illustrating a meter and its periphery of the straddle-type vehicle of FIG. 1.
Figure 4:
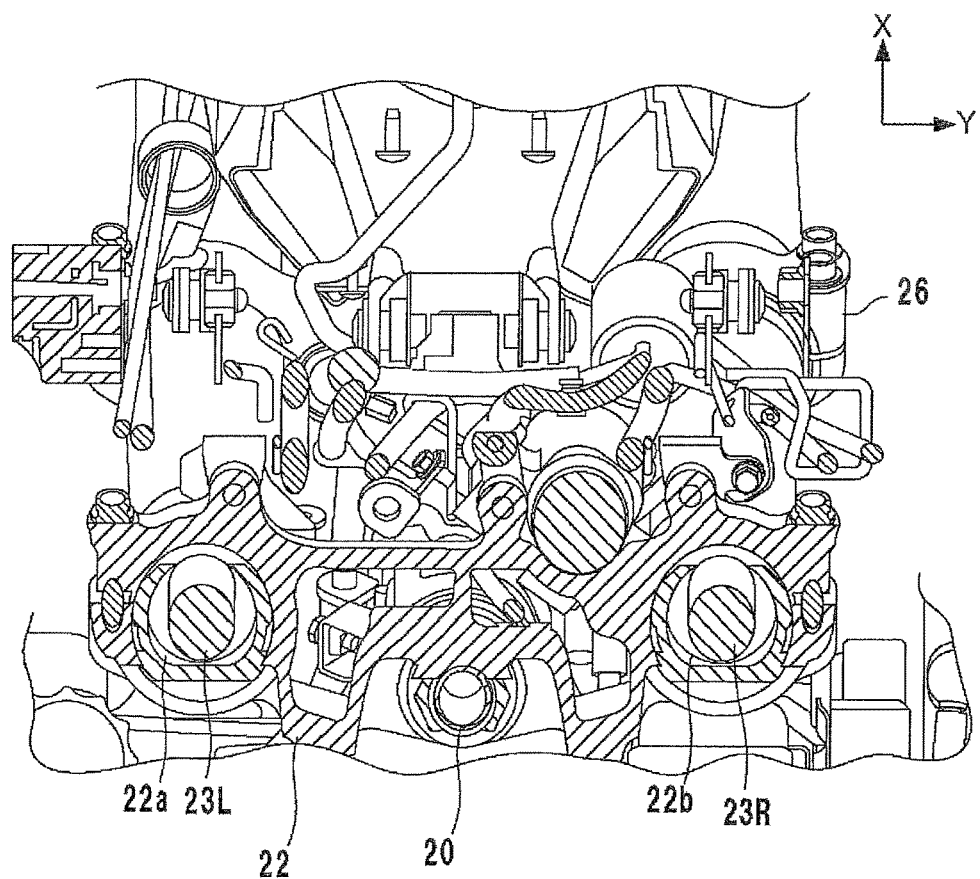
FIG. 4 is a sectional view taken along a line I-I in FIG. 2.

FIG. 1 is a left side view of a straddle-type vehicle 1 according to the embodiment of the present invention, and FIG. 2 is a right side view of the straddle-type vehicle 1. FIG. 3 is a plan view illustrating a meter MP and its periphery, and FIG. 4 is a sectional view taken along a line I-I in FIG. 2. Although the straddle-type vehicle 1 is an off-road motorcycle, the present invention is applicable to various electric straddle-type vehicles including other types of motorcycles. Hereinbelow, the straddle-type vehicle 1 is sometimes referred to as the vehicle 1.

The vehicle 1 includes a body frame 10. The body frame 10 includes: a head pipe 11 which is provided in a front part of the vehicle; a pair of left and right main frames 12, 12; a down frame 13; and a pair of left and right lower frames 14, 14. The head pipe 11 and the down frame 13 are formed of a single member provided to extend along the body center.

The pair of main frames 12, 12, the down frame 13, and the pair of lower frames 14, 14 are coupled together in a loop fashion, and a power unit 2 is disposed inside an area surrounded by these frames. The power unit 2 includes an engine and a transmission. An exhaust pipe 6 configured to guide exhaust gas from the engine to an exhaust muffler 5 is provided ahead of the power unit 2.

The pair of main frames 12, 12 is mounted on an upper part of the head pipe 11, and bends to the left and right above the power unit 2 and then extends obliquely downward and rearward. The down frame 13 is mounted on a lower part of the head pipe 11, extends obliquely downward and then downward linearly along the body center at a position ahead of the power unit 2, and is then coupled at its lower end part to a front end part of the pair of left and right lower frames 14, 14. Each lower frame 14 bends at a part thereof near a front lower part of the power unit 2 toward a space below the power unit 2 and then extends rearward substantially linearly, and its rear end part is coupled to a lower end part of the corresponding main frame 12.

A fuel tank 3 supported on the main frames 12, 12 is disposed above the power unit 2. A seat 4 is disposed immediately behind the fuel tank 3. The seat 4 is supported on a pair of seat frames 15, 15 (see FIGS. 8 and 9). The seat frames 15, 15 extend rearward with their front ends attached to the respective main frames 12, 12. A pair of rear frames 16, 16 (see FIGS. 8 and 9) is connected to the pair of seat frames 15, 15 and the pair of lower frames 14, 14.

A steering stem 20 is turnably supported on the head pipe 11, and a top bridge 22 is mounted on an upper end part of the steering stem 20. A bottom bridge 26 is provided on a lower end part of the steering stem 20. The meter MP is coupled to the top bridge 22 via a meter stay 25 and disposed ahead of the top bridge 22. The meter MP is a display device configured to display various kinds of information such as vehicle speed and engine speed.

A pair of left and right front forks 23L, 23R is supported by fork insertion holes 22a, 22b located in left and right end parts of the top bridge 22. The pair of front forks 23L, 23R is also supported by the bottom bridge 26.

The pair of front forks 23L, 23R is sometimes simply referred to as the pair of front forks 23. A front wheel FW is rotatably supported by lower end parts of the pair of front forks 23 and designed to be steered by a handlebar 24 mounted on the top bridge 22. A pair of grips 21L, 21R to be gripped by a rider is provided on left and right end parts of the handlebar 24. In addition, a brake lever 30 and a brake master cylinder 31 configured to work in conjunction with the brake lever 30 are provided next to the grip 21R.

A front end part of a rear swing arm 18 is swingably supported by the main frames 12, 12 via a pivot shaft 17. A rear wheel RW is supported by a rear end part of the rear swing arm 18, and the rear wheel RW is driven to rotate by a chain (not illustrated) wound around a drive sprocket (not illustrated) of the power unit 2 and a driven sprocket (not illustrated) of the rear wheel RW.

The pair of main frames 12 is also provided with a brake pedal 32 and a brake master cylinder 33 configured to work in conjunction with the brake pedal 32.

A brake system 34 is configured to brake the front wheel FW. The brake system 34 includes: a brake disc 34a which is secured coaxially with the front wheel FW; and a brake caliper 34b which is supported by the lower end part of the front fork 23L. In addition, a speed sensor 37 configured to measure the rotating speed of the front wheel FW is placed at the lower end part of the front fork 23L. A brake system 35 is configured to brake the rear wheel RW. The brake system 35 includes: a brake disc 35a which is secured coaxially with the rear wheel RW; and a brake caliper 35b which is supported by an end part of the rear swing arm 18.

The brake master cylinder 31 and the brake caliper 34b are connected to each other via an ABS modulator 36, and the brake caliper 34b works upon manipulation of the brake lever 30. Based on the result of measurement performed by the speed sensor 37, the ABS modulator 36 controls brake hydraulic pressure to act on the brake caliper 34b if the front wheel FW is about to be locked, and thereby prevents the front wheel FW from being locked. Likewise, the brake master cylinder 33 and the brake caliper 35b are connected to each other via the ABS modulator 36, and the brake caliper 35b works upon manipulation of the brake pedal 32. Based on the result of measurement performed by a sensor (not illustrated) configured to detect the rotating speed of the rear wheel RW, the ABS modulator 36 controls brake hydraulic pressure to act on the brake caliper 35b if the rear wheel RW is about to be locked, and thereby prevents the rear wheel RW from being locked.

The ABS modulator 36 is disposed behind the top bridge 22. In the case of this embodiment, the ABS modulator is supported by the seat frames 15 and the rear frames 16 via a mounting stay 36a, but its installation location is not limited to this. By employing the configuration in which the ABS modulator 36 is not disposed around a steering system by disposing the ABS modulator 36 behind the top bridge 22, it becomes easier to use a space around the steering system as an installation space for other constituents (e.g., an installation space for the meter MP).

For example, the ABS modulator 36 is formed from: a valve unit; a motor which is configured to run the valve unit; and a control circuit which is configured to control the motor.

<Layout of Brake Piping>

Figure 5:
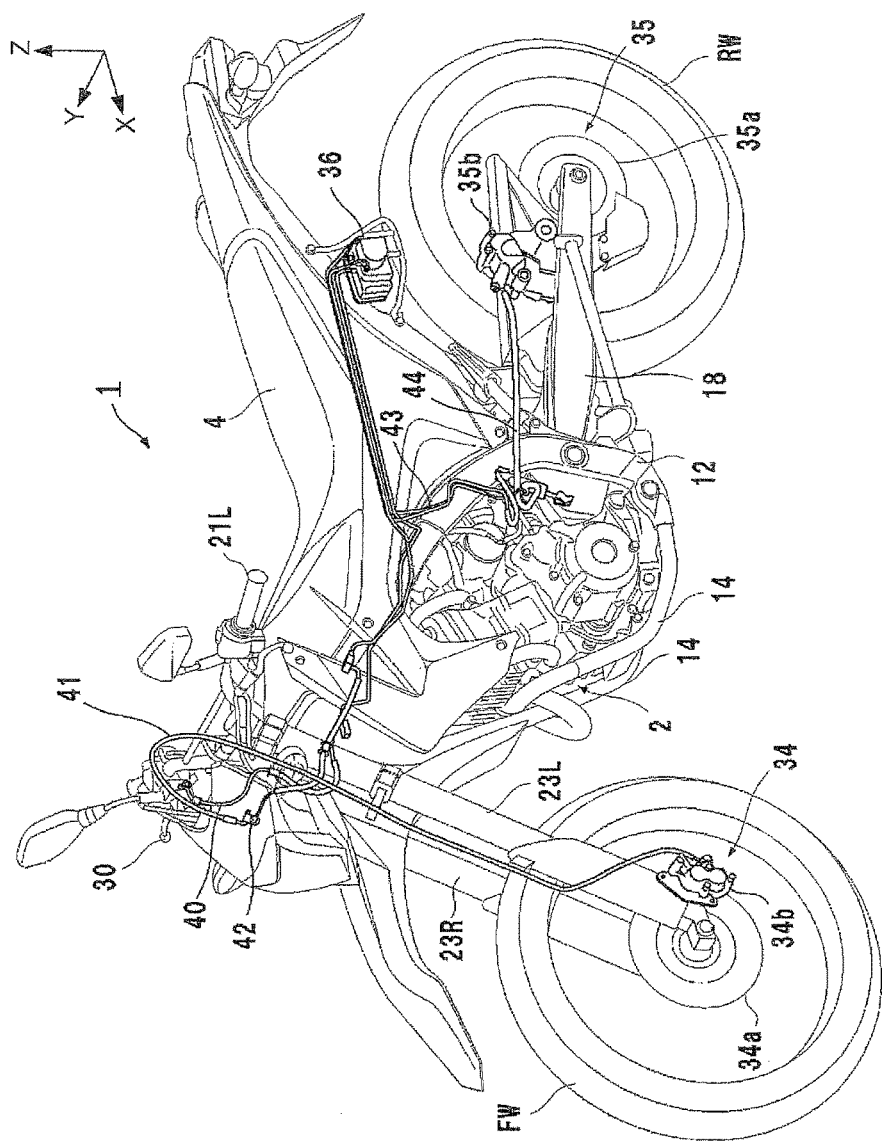
FIG. 5 is a perspective view illustrating the layout of brake piping of the straddle-type vehicle of FIG. 1.
Figure 6:
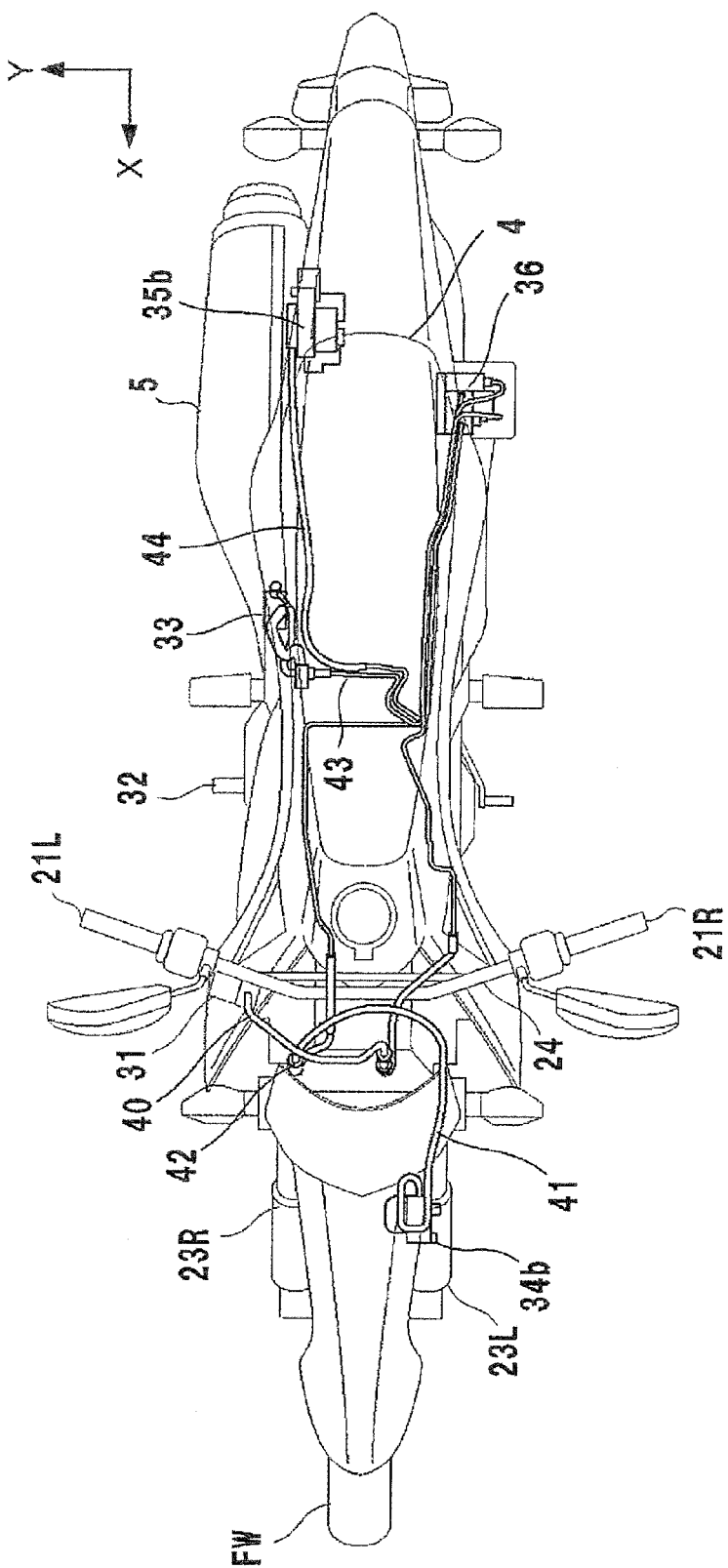
FIG. 6 is a plan view illustrating the layout of the brake piping of the straddle-type vehicle of FIG. 1.
Figure 7:
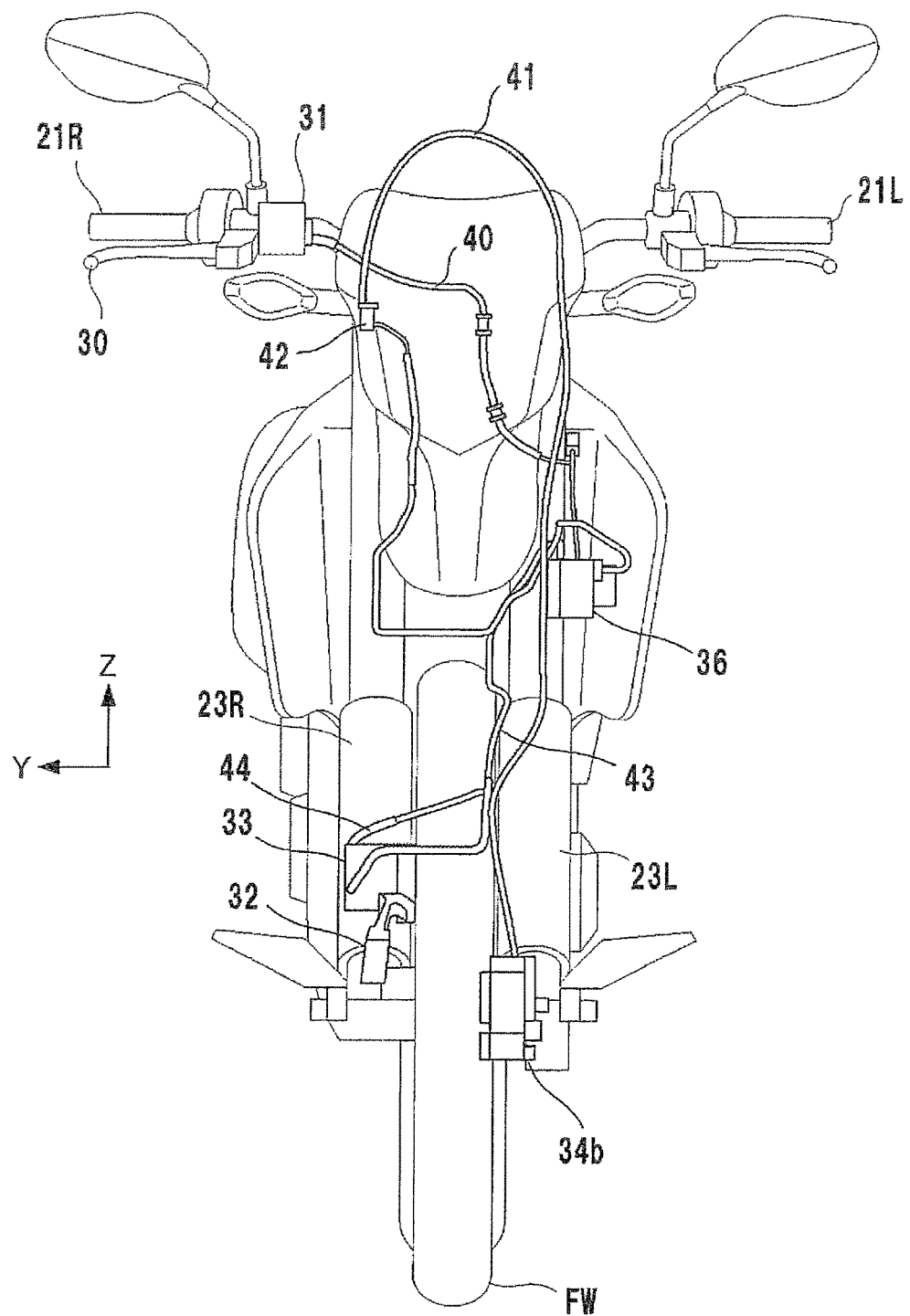
FIG. 7 is a front view illustrating the layout of the brake piping of the straddle-type vehicle of FIG. 1.
Figure 8:
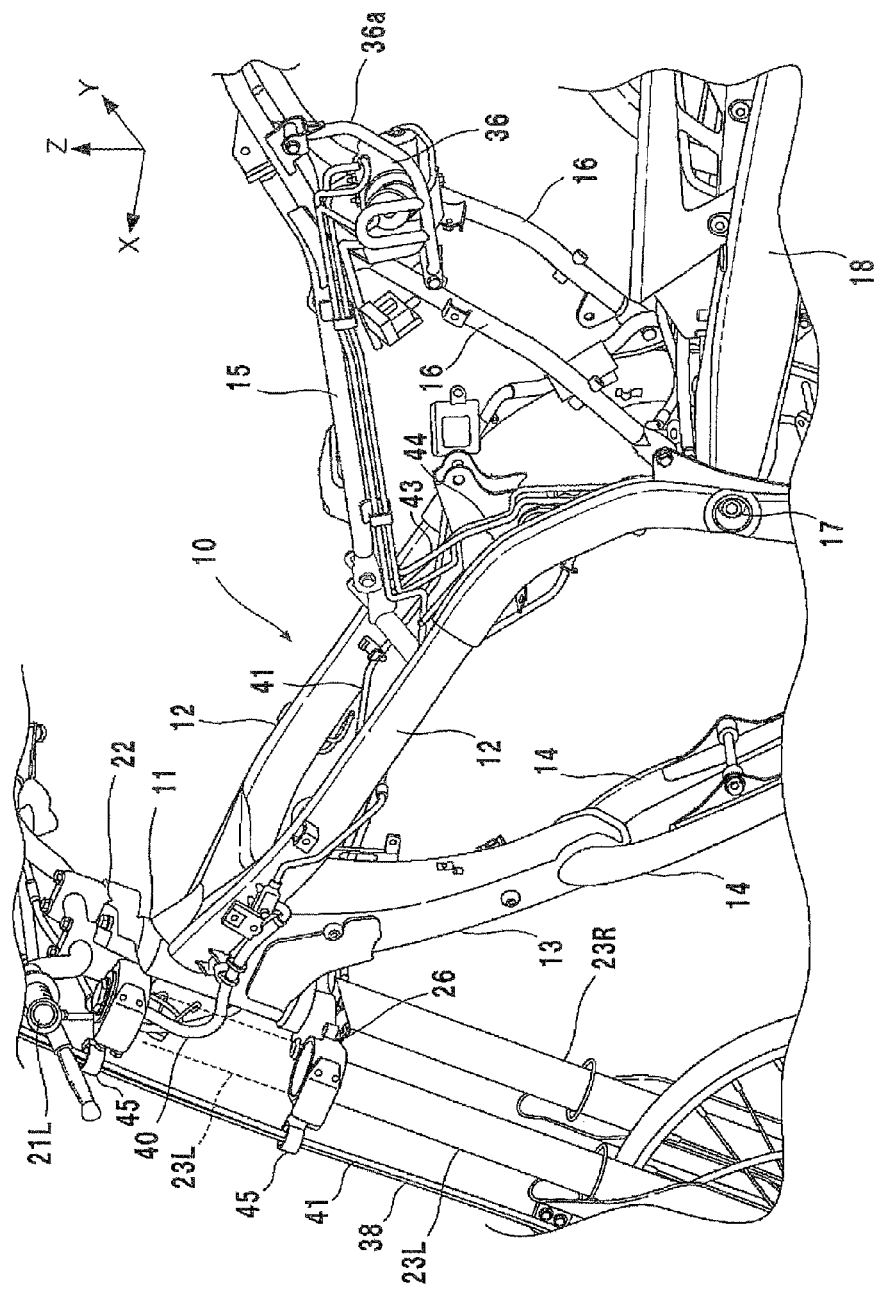
FIG. 8 is a perspective view illustrating the layout of the brake piping on a frame of the straddle-type vehicle of FIG. 1.
Figure 9:
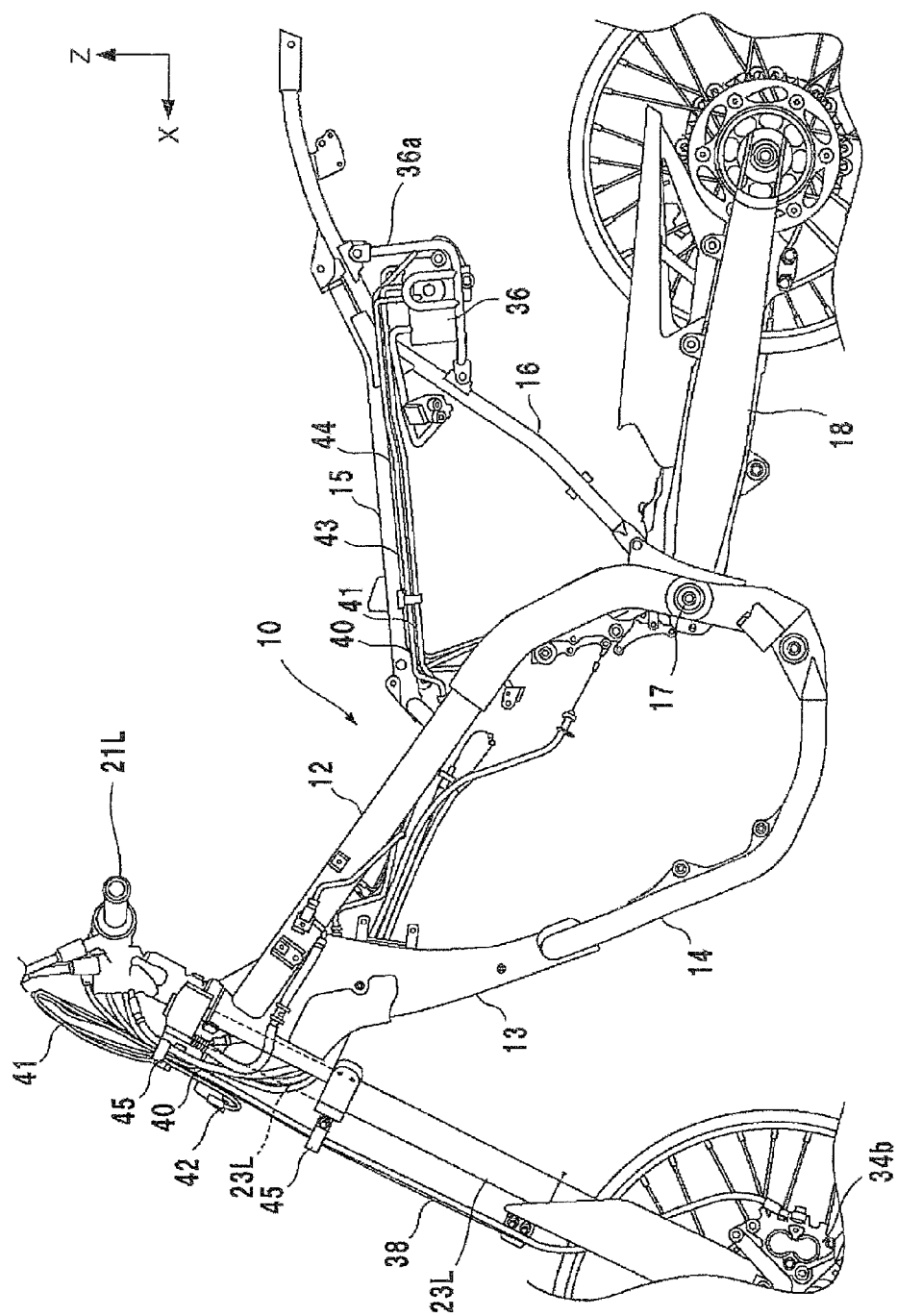
FIG. 9 is a left side view illustrating the layout of the brake piping on the frame of the straddle-type vehicle of FIG. 1.

A description is given of the layout of brake piping related to the brake systems 34, 35 and the ABS modulator 36. FIGS. 5 to 7 are perspective views illustrating the layout of the brake piping, in which FIG. 5 is a perspective view, FIG. 6 is a plan view, and FIG. 7 is a front view. In addition, FIGS. 8 and 9 illustrate the layout of the brake piping on the body frame 10, in which FIG. 8 is a perspective view and FIG. 9 is a left side view.

The brake piping includes: a brake pipe 40 which connects the brake master cylinder 31 and the ABS modulator 36 to each other; a brake pipe 41 which connects the ABS modulator 36 and the brake caliper 34b of the brake system 34; a brake pipe 43 which connects the brake master cylinder 33 and the ABS modulator 36; and a brake pipe 44 which connects the ABS modulator 36 and the brake caliper 35b of the brake system 35. Each of the brake pipes 40, 41, 43, and 44 is basically formed of a flexible hose made of rubber, for example, and partially uses a metal pipe and the like.

In the case of this embodiment, since the ABS modulator 36 is located in a rear part of the vehicle, the brake pipes 40, 41 related to the brake system 34 are designed to have a relatively long length. The routing of these pipes is described briefly. The brake pipe 40 extends from the brake master cylinder 31 to the front side of the head pipe 11, and then extends to the outer side of the left main frame 12 through a space between the head pipe 11 and the front fork 23L and between the top bridge 22 and the bottom bridge 26. This brake pipe further extends to the ABS modulator 36 through a space between the main frames 12, 12. In this way, the brake pipe 40 extends from the brake master cylinder 31 located on the right side of the vehicle to the ABS modulator 36 while making a detour to the left side of the vehicle and passing through the left side of the vehicle. This reduces the curvature of the brake pipe 40 in bending.

Meanwhile, the brake pipe 41 passes through the left side of the vehicle from the ABS modulator 36, then bends to the right side of the vehicle, and then extends forward of the head pipe 11 while passing through the right side of the vehicle. This pipe further extends upward through a supporter 42 secured to the vehicle body, and then curves to the left side of the vehicle body and extends to the brake caliper 34b.

In the case of this embodiment, the ABS modulator 36 is located on the left side of the vehicle, whereas the brake master cylinder 33 and the brake caliper 35b are located on the right side of the vehicle. The brake pipe 43 slightly extends to the left side of the vehicle from the brake master cylinder 33, and then extends toward the rear of the vehicle to be connected to the ABS modulator 36. The brake pipe 44 extends toward the front of the vehicle from the ABS modulator 36, then slightly extends to the right side of the vehicle, and then extends toward the rear of the vehicle to be connected to the brake caliper 35b.

Figure 10:
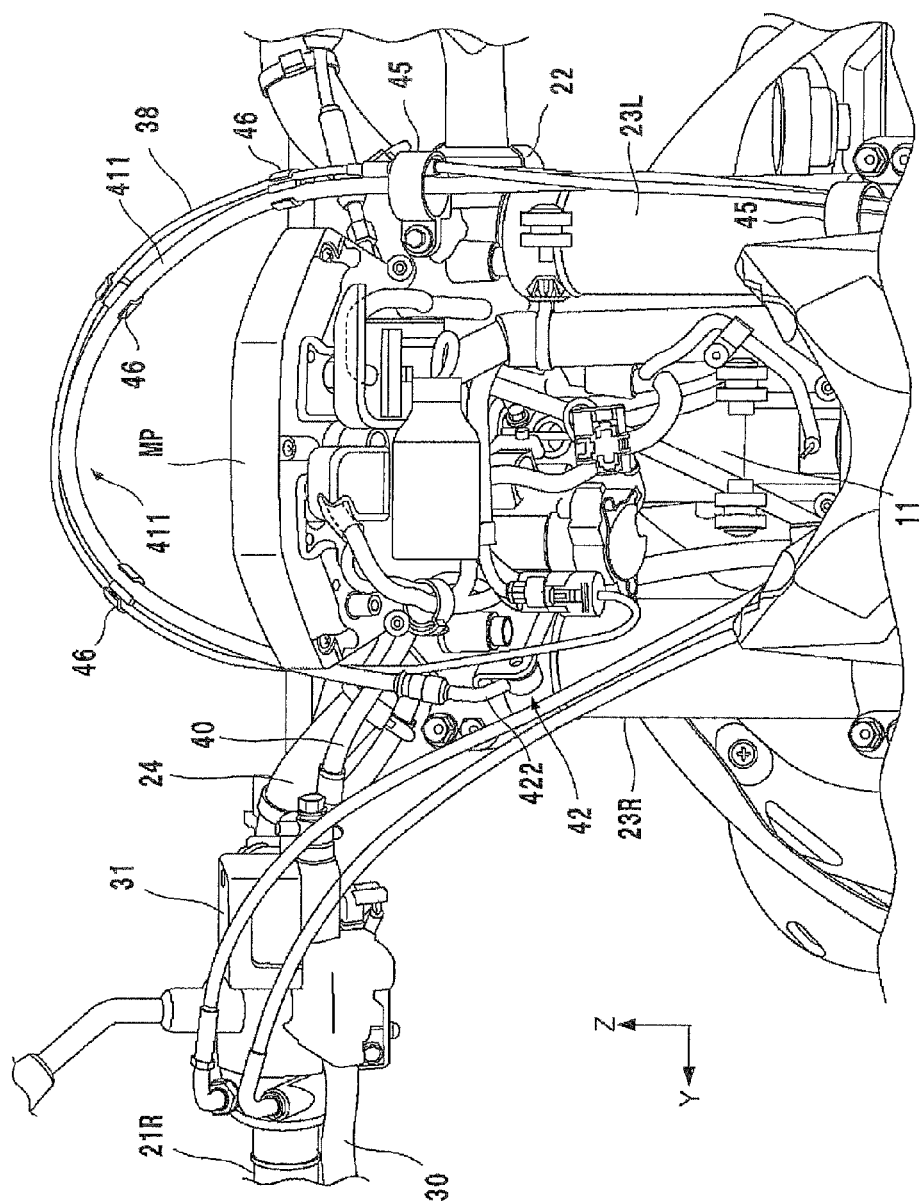
FIG. 10 is a front view illustrating the layout of the brake piping of the straddle-type vehicle of FIG. 1.
Figure 11:
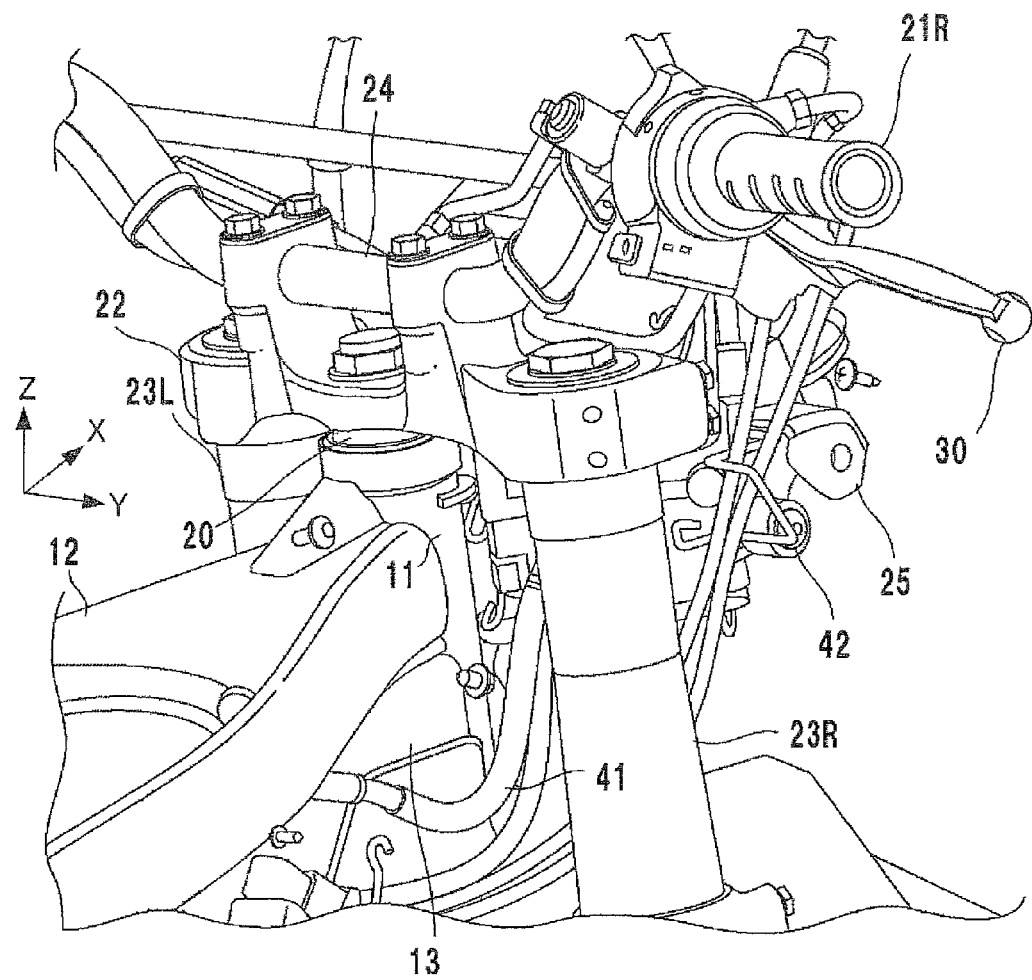
FIG. 11 is a perspective view illustrating the layout of the brake piping of the straddle-type vehicle of FIG. 1.
Figure 12:
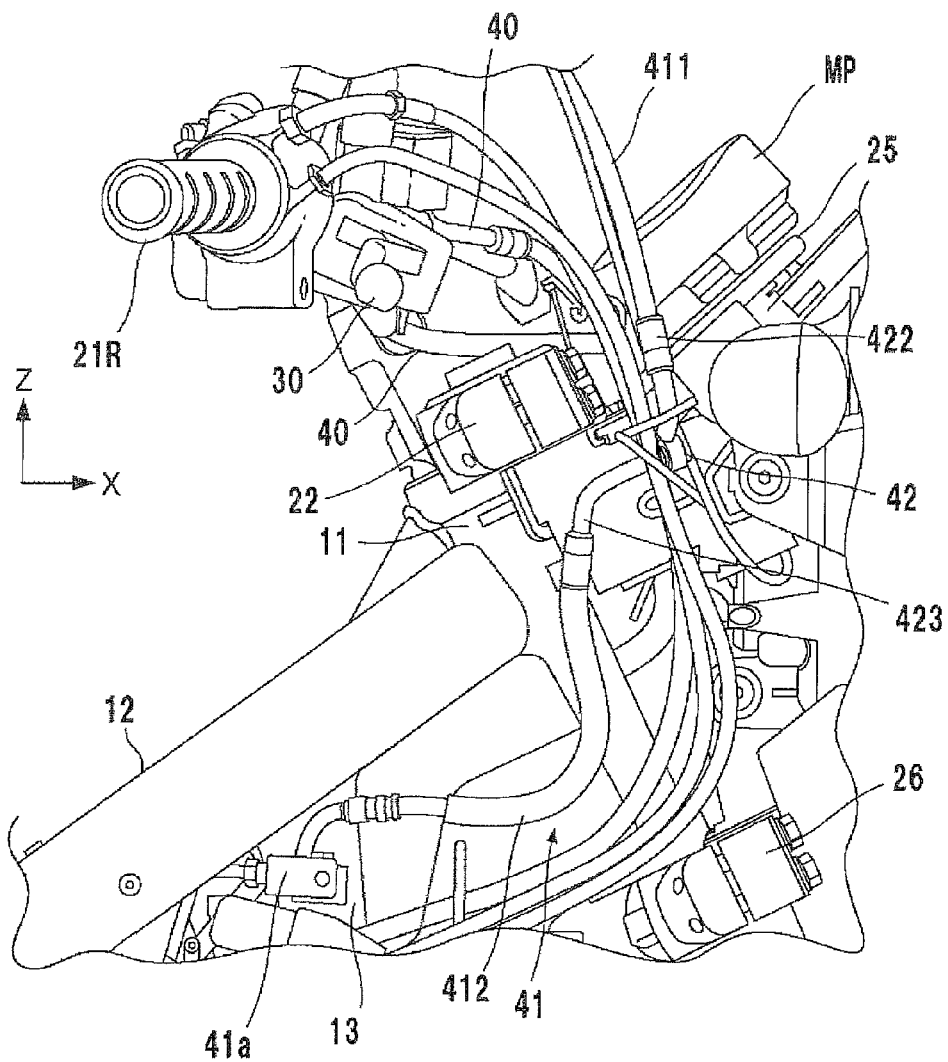
FIG. 12 is a right side view illustrating the layout of the brake piping of the straddle-type vehicle of FIG. 1.

The layout of the brake pipes 40, 41 is further described. FIGS. 10 to 12 are views illustrating the layout of the brake pipes 40, 41, in which FIG. 10 is a front view, FIG. 11 is a perspective view, and FIG. 12 is a right side view. As described previously, the vehicle 1 of this embodiment is an off-road motorcycle, and thus the pair of front forks 23 is designed to have relatively long expansion stroke. The brake pipe 41 needs to have play long enough to follow the expansion of the pair of front forks 23.

In the case of this embodiment, as is clear from FIG. 10, the brake pipe 41 is curved in the shape of an inverted U protruding upward in the front view. By ensuring the pipe length with this curve portion, the brake pipe 41 has such a configuration as to follow the expansion of the pair of front forks 23.

The layout of the brake pipe 41 is described more specifically. As illustrated in FIG. 11, the brake pipe 41 first extends from a part of the vehicle behind the top bridge 22 and below the top bridge 22 to the front side of the vehicle through a space between the head pipe 11 and the front fork 23R and between the top bridge 22 and the bottom bridge 26, and is then supported by the supporter 42. As described previously, the brake pipe 40 passes through the space at the left side of the head pipe 11, and these brake pipes are configured so that the brake pipe 41 passes through a right one of the spaces partitioned off by the head pipe 11 and the brake pipe 40 passes though the left one. This makes the brake pipes 40, 41 less likely to interfere with each other during steering. Further, since the brake pipes 40, 41 cross each other in a relatively open space located ahead of the head pipe 11, it is possible to prevent the brake pipes 40, 41 from interfering with each other during steering.

The configuration related to the steering performance is further described. As illustrated in FIG. 12, the brake pipe 41 has an anchor point 41a attached to the down frame 13 at a position rearward of the pair of front forks 23 (i.e., at a part of the brake pipe on its rear side with respect to the vehicle that is located before the space between the top bridge 22 and the bottom bridge 26 through which this pipe passes). The anchor point 41a is disposed on an upper part of the down frame 13 at a position below the supporter 42 and on the further inner side than the supporter in the vehicle widthwise direction. By securing the brake pipe 41 with the anchor point 41a set at this position, the brake pipe 41 is secured near the head pipe 11 and close to the center in the vehicle widthwise direction. Since the brake pipe 41 extends rearward and inward as seen from the supporter 42, it becomes easier to prevent the pair of front forks 23 and the brake pipe 41 from coming into contact with each other during steering. In addition, it is possible to minimize the movement of the brake pipe 41 during steering and, at the same time, dispose the brake pipe 41 compactly in the vehicle widthwise direction.

Next, the brake pipe 41 passes through the space between the top bridge 22 and the bottom bridge 26, and is then supported by the supporter 42. The supporter 42 is secured to the vehicle body, and the brake pipe 41 is secured to the vehicle body by the supporter 42. The supporter 42 is placed on the front fork 23R side at a position ahead of the top bridge 22 with respect to the vehicle. In the case of this embodiment, in particular, as illustrated in FIG. 10, the supporter 42 is disposed so as to overlap the front fork 23R when the vehicle is viewed from the front. Accordingly, the brake pipe 41 can be secured at a position spaced from the brake caliper 34b as the connection destination in the vehicle widthwise direction, which enables the inverted U-shaped curve portion of the pipe to have a larger width in the lateral direction. This is advantageous in ensuring the pipe length of the brake pipe 41 long enough to follow the expansion of the pair of front forks 23. In addition, since the brake pipe 41 has such a shape as to span the front fork 23R and the front fork 23L, the brake pipe 41 can be prevented from interfering with other vehicle constituents arranged between or around the pair of front forks 23.

Figure 13:
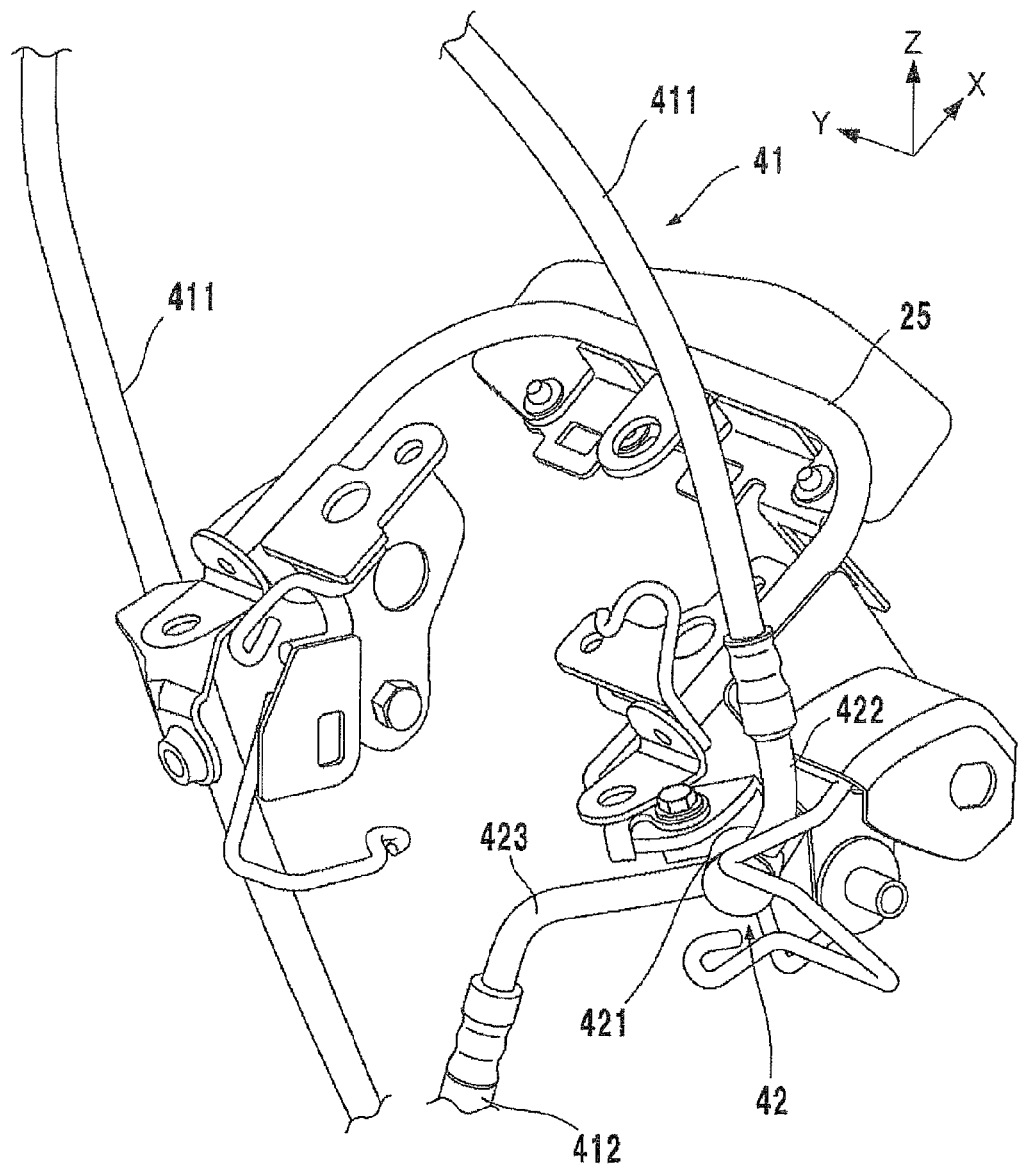
FIG. 13 is a perspective view illustrating a meter stay and a supporter of the straddle-type vehicle of FIG. 1.

In the case of this embodiment, the supporter 42 is secured to the meter stay 25. FIG. 13 is a perspective view of the meter stay 25 and the supporter 42. By securing the supporter 42 to the vehicle body by use of the meter stay 25, it is possible to secure the brake pipe 41 easily without additionally disposing any member to the top bridge 22 or the head pipe 11 for supporting the supporter 42.

The brake pipe 41 includes: a pipe section 411 which extends from the supporter 42 toward the brake system 34; and a pipe section 412 which extends from the supporter 42 toward the ABS modulator 36. Each of the pipe sections 411, 412 is a flexible hose, and the pipe section 411 constitutes the inverted U-shaped portion.

The supporter 42 includes: a fastening portion 421 which is fastened to the meter stay 25 with a bolt; a front connection portion 422 to which the pipe section 411 is connected; and a rear connection portion 423 to which the pipe section 412 is connected. The fastening portion 421 employs a banjo fitting structure using a banjo bolt, for example. The front connection portion 422 and the rear connection portion 423 are metal pipes communicating with each other and being directed in different directions. Specifically, the front connection portion 422 is directed upward from the fastening portion 421 and serves as a guide for the pipe section 411 to extend upward. Meanwhile, the rear connection portion 423 is directed rearward and inward and serves as a guide for the pipe section 412 to extend to the anchor point 41a. In this way, since the pipe sections 411, 412 of the brake pipe 41 can be secured at different angles by the supporter 42, the brake pipe 41 can be stably secured in a small space. In addition, the brake pipe 41 extending from the rear can be disposed at an upper position as desired.

Referring to FIG. 10, the pipe section 411 of the brake pipe 41 extends upward from the front connection portion 422, and curves in the shape of an inverted U toward the front fork 23L while passing through a higher position than the top bridge 22. The brake pipe then extends downward along the front fork 23L. Multiple ring-shaped holders 45 are provided on the front fork 23L side, and the brake pipe 41 passes through the multiple holders 45. The holders 45 do not restrain the movement of the brake pipe 41 in its longitudinal direction. Accordingly, the level of the inverted U-shaped portion of the pipe section 411 of the brake pipe 41 varies with the expansion of the pair of front forks 23, whereby the pipe section 411 can follow this expansion.

A sensor cable 38 connected to the speed sensor 37 is fixed to the brake pipe 41 with multiple fixing tools 46. The sensor cable 38 connects the speed sensor 37 and the ABS modulator 36 to each other, for example. The sensor cable 38 may connect the speed sensor 37 and the meter MP to each other instead.

As in the case of the brake pipe 41, the sensor cable 38 curves in the shape of an inverted U from the front fork 23R side toward the front fork 23L while passing through a higher position than the top bridge 22. With this curve, the sensor cable 38 can also ensure play long enough to follow the expansion of the pair of front forks 23. In addition, by fixing the sensor cable 38 to the brake pipe 41 with the multiple fixing tools 46, the brake pipe 41 can also be used as a support member for the sensor cable 38. Some of the multiple fixing tools 46 fix the sensor cable 38 to the pipe section 411 of the brake pipe 41 at positions higher than the top bridge 22, which makes the pipe section 411 and the sensor cable 38 less likely to be separated from each other during the expansion of the pair of front forks 23.

Figure 14:
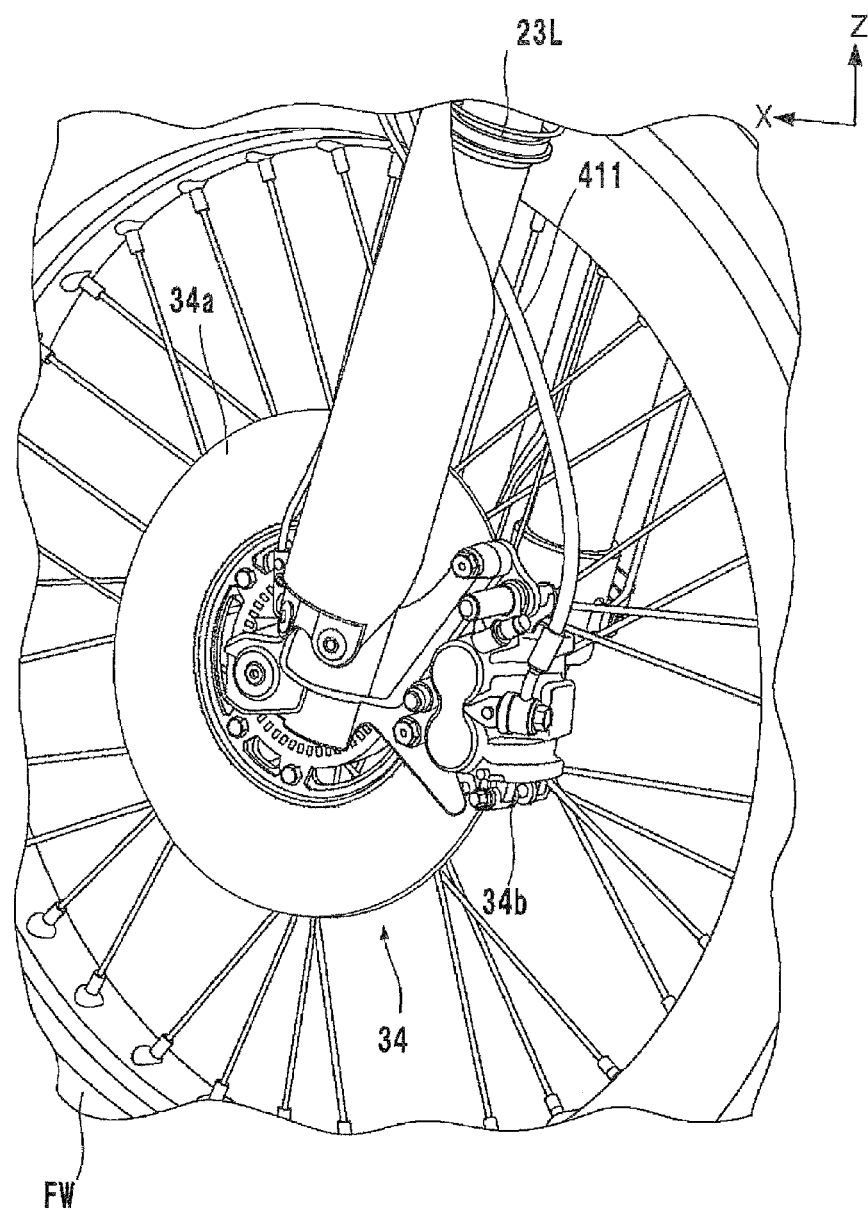
FIG. 14 is a perspective view illustrating a front wheel brake system of the straddle-type vehicle of FIG. 1.
Figure 15:
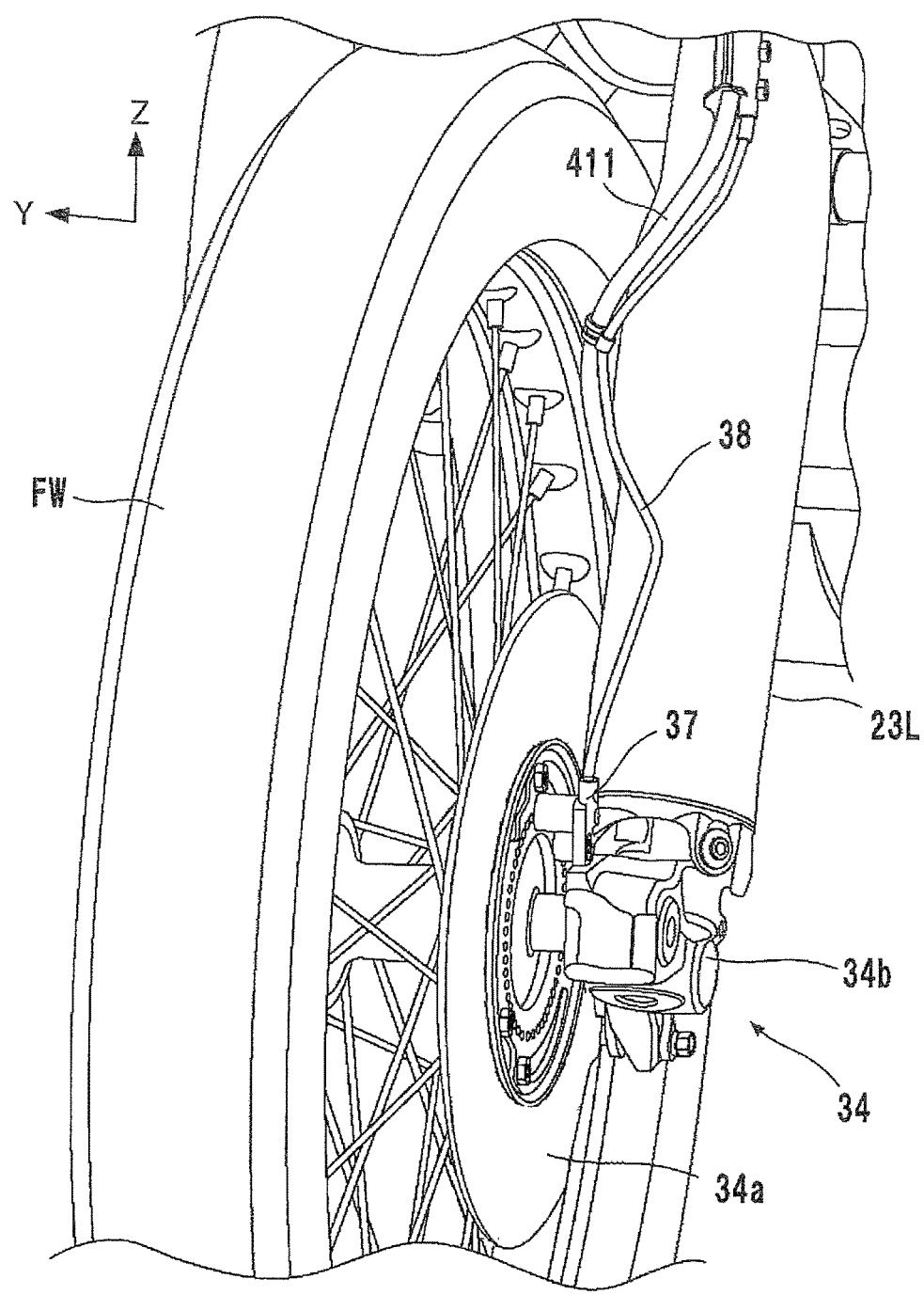
FIG. 15 is a perspective view illustrating a front wheel speed sensor of the straddle-type vehicle of FIG. 1.

While being bundled together, the pipe section 411 of the brake pipe 41 and the sensor cable 38 pass through the multiple fixing tools 46 and extend downward along the front fork 23L. The pipe section 411 and the sensor cable 38 are separated at their end parts from each other in the longitudinal direction of the vehicle, and the pipe section 411 is connected to the brake caliper 34b as illustrated in FIG. 14 whereas the sensor cable 38 is connected to the speed sensor 37 as illustrated in FIG. 15.

As has been described, in this embodiment, since the brake pipe 41 is placed to pass through a space above the top bridge 22, the brake pipe 41 can ensure play long enough to follow the expansion of the pair of front forks 23 even if this expansion is large. In addition, since the brake pipe 41 extending from the ABS modulator 36 disposed at the rear passes through the space between the front fork 23R and the head pipe 11, it is possible to inhibit the brake pipe 41 from protruding outside the pair of front forks 23 and dispose the brake pipe 41 compactly. Further, since the brake pipe 41 is supported by the supporter 42 at a position ahead of the top bridge 22, the swing of the brake pipe 41 caused by the expansion of the pair of front forks 23 becomes relatively smaller at a position between the front fork 23R and the head pipe 11, whereby the brake pipe 41 can be disposed in the narrow space between the front fork 23R and the head pipe 11. Thus, it is possible to dispose the ABS modulator 36 behind the top bridge 22 and, at the same time, allow the brake pipe 41 to ensure play long enough to follow the expansion of the pair of front forks 23.

According to the embodiment of the present invention, since the brake pipe is placed to pass through a space above the top bridge, the brake pipe can ensure play long enough to follow the expansion of the pair of front forks even if this expansion is large in the vehicle. In addition, since the brake pipe extending from the ABS modulator disposed at the rear passes through the space between the second front fork and the head pipe, it is possible to inhibit the brake pipe from protruding outside the pair of front forks and dispose the brake pipe compactly. Further, since the brake pipe is supported by the supporter at a position ahead of the top bridge, the swing of the brake pipe caused by the expansion of the pair of front forks becomes relatively smaller at a position between the second front fork and the head pipe, whereby the brake pipe can be disposed in the narrow space between the second front fork and the head pipe. Thus, it is possible to dispose the ABS modulator behind the top bridge and, at the same time, allow the brake pipe to ensure play long enough to follow the expansion of the pair of front forks.

According to the embodiment of the present invention, since the brake pipe extends rearward and inward from the supporter owing to the position of the anchor point, it becomes easier to prevent the pair of front forks and the brake pipe from coming into contact with each other during steering. In addition, since the anchor point is disposed on the upper part of the down frame, the anchor point can be located near the head pipe, thus making it possible to minimize the movement of the brake pipe during steering and, at the same time, dispose the brake pipe compactly in the vehicle widthwise direction.

According to the embodiment of the present invention, since the brake pipe has such a shape as to span the second front fork and the first front fork, the brake pipe can be prevented from interfering with other vehicle constituents arranged between or around the pair of front forks.

According to the embodiment of the present invention, by securing the supporter to the meter stay, it is possible to secure the brake pipe easily without additionally disposing any member to the top bridge or the head pipe for supporting the supporter.

According to the embodiment of the present invention, since the pipe sections of the brake pipe can be secured at different angles by the supporter, the brake pipe can be stably secured in a small space. In addition, the brake pipe extending from the rear can be disposed at an upper position as desired.

According to the embodiment of the present invention, the sensor cable can also ensure the length long enough to follow the expansion of the pair of front forks.

According to the embodiment of the present invention, the brake pipe can also be used as a support member for the sensor cable.

According to the embodiment of the present invention, it is possible to reduce the bend of the second brake pipe and, at the same time, allow the brake pipe connected to the front wheel braking unit to ensure enough space for swinging without any interference by the second brake pipe.

Obviously, numerous modifications and variations of the present invention are possible in light of the above teachings. It is therefore to be understood that within the scope of the appended claims, the invention may be practiced otherwise than as specifically described herein.

What is claimed is:

1. A straddled vehicle including:
   a steering stem which is turnably supported on a head pipe provided in a front part of said vehicle;
   a top bridge which is provided on an upper end part of said steering stem;
   a pair of front forks which are respectively supported by left and right fork insertion holes of said top bridge;
   a front wheel braking unit which is placed on a side that includes a first front fork of said pair of front forks and configured to apply braking force to a front wheel;
   an ABS modulator which is disposed behind said top bridge and configured to control the braking force of said front wheel braking unit; and
   a brake pipe which connects said ABS modulator and said front wheel braking unit to each other,
   said straddled vehicle comprising a supporter which is placed on a side that includes a second front fork of said pair of front forks at a position ahead of said top bridge with respect to said vehicle and configured to support said brake pipe,
   wherein said brake pipe
      extends from a part of said vehicle behind said top bridge and passes through a space between said head pipe and said second front fork below said top bridge to be supported by said supporter,
      extends upward through said supporter and curves toward said first front fork while passing through a higher position than said top bridge, and
      extends along said first front fork to be connected to said front wheel braking unit.

2. The straddled vehicle according to claim 1, wherein said brake pipe extends through said supporter toward a rear of said vehicle so as to pass more inward than said supporter in a vehicle widthwise direction,
   said head pipe includes a down frame which extends downward from said head pipe,
   said brake pipe has an anchor point which is attached to said down frame at a position behind said pair of front forks, and
   said anchor point is disposed on an upper part of said down frame at a position below said supporter and more inward than said supporter in the vehicle widthwise direction.

3. The straddled vehicle according to claim 1, wherein said supporter is disposed to overlap said second front fork when said vehicle is seen from a front.

4. The straddled vehicle according to claim 1, further comprising:
   a meter which is disposed ahead of said top bridge; and
   a meter stay which couples said meter and said top bridge to each other,
   wherein said supporter is secured to said meter stay.

5. The straddled vehicle according to claim 4, wherein said brake pipe includes:
      a first pipe section which extends from said supporter toward said front wheel braking unit; and
      a second pipe section which extends from said supporter toward said ABS modulator,
   said supporter includes:
      a fastening portion which is fastened to said meter stay;
      a front connection portion to which said first pipe section is connected; and
      a rear connection portion to which said second pipe section is connected, and
   said front connection portion and said rear connection portion are directed in different directions and communicate with each other.

6. The straddled vehicle according to claim 1, further comprising:
   a speed sensor which is placed on the side that includes said first front fork and configured to measure rotating speed of said front wheel; and
   a sensor cable which is connected to said speed sensor,
   wherein said sensor cable
      curves from the side that includes said second front fork toward said first front fork while passing through a higher position than said top bridge, and
      extends along said first front fork to be connected to said speed sensor.

7. The straddled vehicle according to claim 6, wherein said sensor cable is fixed to said brake pipe at a higher position than said top bridge.

8. The straddled vehicle according to claim 1, further comprising:
   a handlebar which is supported on said steering stem;
   a brake master cylinder which is provided on said handlebar; and
   a second brake pipe which connects said brake master cylinder and said ABS modulator to each other,
   wherein said second brake pipe extends to a front side of said head pipe from said brake master cylinder, and extends rearward while passing through a space between said head pipe and said first front fork.

9. A straddled vehicle comprising:
   a steering stem turnably supported by a head pipe which is provided in a front part in a front-rear direction of the vehicle;
   a top bridge provided on an upper end part of the steering stem and having a first fork insertion hole and a second fork insertion hole;
   a first front fork supported by the first front insertion hole;
   a second front fork supported by the second front insertion hole, a front wheel being provided between the first front fork and the second front fork;
   a front wheel braking unit provided at the first front fork to apply braking force to the front wheel;
   an ABS modulator disposed rearward with respect to the top bridge in the front-rear direction and configured to control the braking force applied by the front wheel braking unit;

a supporter provided at the second front fork forward with respect to the top bridge in the front-rear direction; and a brake pipe supported by the supporter and extending from the ABS modulator to the front wheel braking unit through the supporter, the brake pipe between the ABS modulator and the supporter passing through a space between the head pipe and the second front fork below the top bridge, the brake pipe between the supporter and the front wheel braking unit passing through a position higher than the top bridge to be connected to the front wheel braking unit.

10. The straddled vehicle according to claim 9, wherein the brake pipe between the supporter and the front wheel braking unit extends along the first front fork.

11. The straddled vehicle according to claim 9, wherein the brake pipe between the supporter and the front wheel braking unit passes through the position higher than the top bridge in curved shape.

12. The straddled vehicle according to claim 9, wherein the brake pipe extends through the supporter toward a rear of the vehicle so as to pass more inward than the supporter in a vehicle widthwise direction, the head pipe includes a down frame which extends downward from the head pipe, the brake pipe has an anchor point which is attached to the down frame at a position behind the first and second front forks, and the anchor point is disposed on an upper part of the down frame at a position below the supporter and more inward than the supporter in the vehicle widthwise direction.

13. The straddled vehicle according to claim 9, wherein the supporter is disposed to overlap the second front fork when the vehicle is seen from a front.

14. The straddled vehicle according to claim 9, further comprising:

a meter which is disposed ahead of the top bridge; and a meter stay which couples the meter and the top bridge to each other, wherein the supporter is secured to the meter stay.

15. The straddled vehicle according to claim 14, wherein the brake pipe includes:

a first pipe section which extends from the supporter toward the front wheel braking unit; and a second pipe section which extends from the supporter toward the ABS modulator, the supporter includes:

a fastening portion which is fastened to the meter stay;

a front connection portion to which the first pipe section is connected; and a rear connection portion to which the second pipe section is connected, and the front connection portion and the rear connection portion are directed in different directions and communicate with each other.

16. The straddled vehicle according to claim 9, further comprising:

a speed sensor which is placed on the side that includes the first front fork and configured to measure rotating speed of the front wheel; and a sensor cable which is connected to the speed sensor, wherein the sensor cable curves from the side that includes the second front fork toward the first front fork while passing through a higher position than the top bridge, and extends along the first front fork to be connected to the speed sensor.

17. The straddled vehicle according to claim 16, wherein the sensor cable is fixed to the brake pipe at a higher position than the top bridge.

18. The straddled vehicle according to claim 9, further comprising:

a handlebar which is supported on the steering stem;

a brake master cylinder which is provided on the handlebar; and a second brake pipe which connects the brake master cylinder and the ABS modulator to each other, wherein the second brake pipe extends to a front side of the head pipe from the brake master cylinder, and extends rearward while passing through a space between the head pipe and the first front fork.

* * * * *